(12) United States Patent
Mabuchi (10) Patent No.: US 6,219,740 B1
(45) Date of Patent: *Apr. 17, 2001

(54) INFORMATION PROCESSING DEVICE

(75) Inventor: Ken Mabuchi, Kanagawa (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/680,540

(22) Filed: Jul. 9, 1996

(30) Foreign Application Priority Data

Jul. 10, 1995 (JP) ................................. 7-173214

(51) Int. Cl.[7] ..................................... G06F 13/38
(52) U.S. Cl. ........................ 710/130; 710/127; 711/2
(58) Field of Search .......................... 395/310, 163, 395/495, 307; 364/200; 345/501; 710/130, 127, 131, 132; 709/200, 214, 216, 239

(56) References Cited

U.S. PATENT DOCUMENTS

| 4,939,636 | * | 7/1990 | Nakagawa et al. | 364/200 |
|---|---|---|---|---|
| 5,361,340 | * | 11/1994 | Kelly et al. | 711/3 |
| 5,440,689 | * | 8/1995 | Reilly et al. | 709/216 |
| 5,507,026 | * | 4/1996 | Fukushima et al. | 395/163 |
| 5,509,137 | * | 4/1996 | Itomitsu et al. | 395/495 |
| 5,548,592 | * | 8/1996 | Komarek et al. | 370/271 |
| 5,553,252 | * | 9/1996 | Takayanagi et al. | 395/310 |
| 5,664,161 | * | 9/1997 | Fukushima et al. | 345/501 |

* cited by examiner

Primary Examiner—Robert Beausoleil
Assistant Examiner—Tim Vo
(74) Attorney, Agent, or Firm—Oblon, Spivak, McClelland, Maier & Neustadt, P.C.

(57) ABSTRACT

An information processing device has a plurality of processors each having a register file formed on a single semiconductor chip. A virtual register in one processor and an extension register in the other processor are connected directly through an exclusive data transfer bus to directly execute data read/write operations between these virtual and extension registers. For example, each virtual register and extension register has a 32 bit width and data transfers between these registers are performed in parallel. These fixed connection wires directly connected between these registers are formed during fabrication processes.

21 Claims, 10 Drawing Sheets

FIG.1

ONE SEMICONDUCTOR CHIP

INFORMATION PROCESSING DEVICE

BACKGROUND OF THE INVENTION

1. Field of the Invention

The present invention relates to an information processing device for processing information which is made up of a plurality of processors each having a register file formed on a single semiconductor chip.

2. Description of the Prior Art

Figure 1:
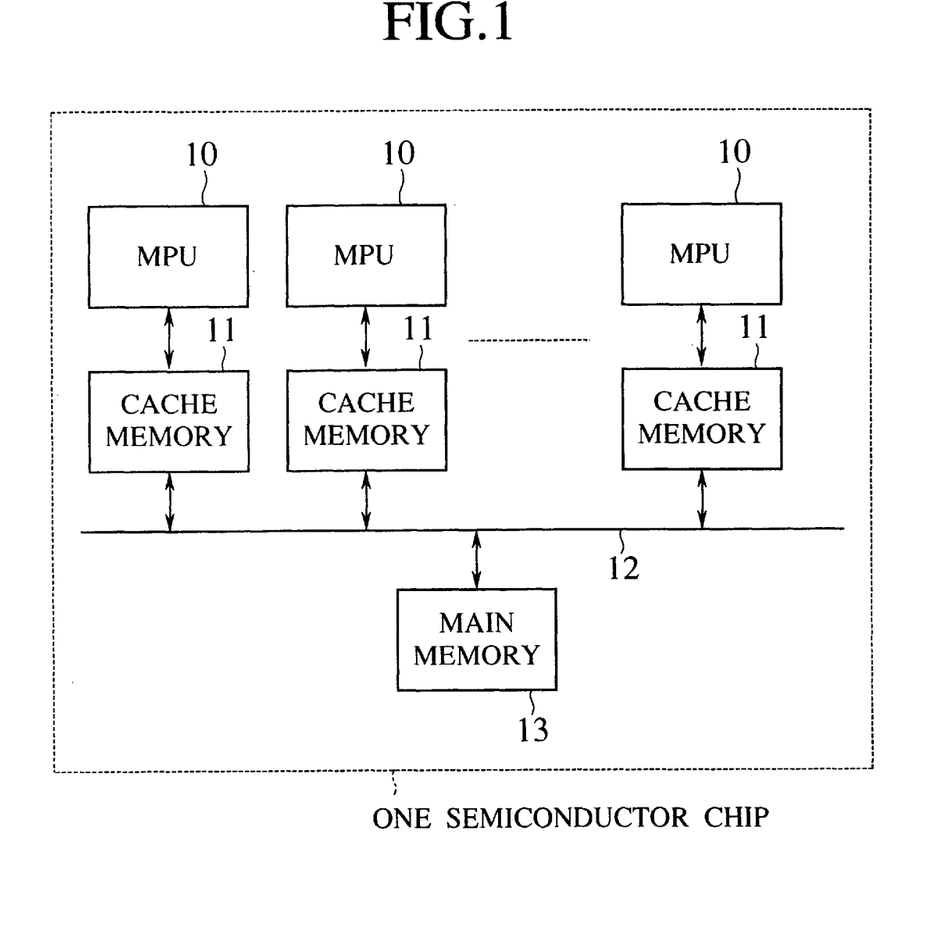
FIG. 1 is a configuration diagram of a conventional information processing device having a plurality of processors (a multi-processor) formed on a single semiconductor chip.

Conventionally, in an information processing device of FIG. 1 including a plurality of processors 10 (or a multi-processor information processing device) formed on a single semiconductor chip, a cache memory 11 is incorporated for each processor 10 and each cache memory 11 is electrically connected to a main memory 13 through a common bus 12. In the prior art, there is a problem that the conventional information processing device has a poor execution efficiency or poor performance because data is transferred between the processors 10 through the main memory 13, so that latency of a memory access operation becomes low.

In order to avoid this drawback described above and so that the processors 10 perform efficiently, data transfer operation must be performed between the cache memories 11, not through the main memory 13, as much as possible. In other words, the number of accesses to the main memory 13 must be reduced in the conventional information processing device. But, this causes some limitations on programs to be executed in the conventional information processing device.

Furthermore, the cache coherency problem between the cache memories 11 and the main memory 13 becomes so complicated that it must be required to form a complicated configuration of the conventional information processing device.

As described above, in the conventional information processing device having a plurality of processors, there is the drawback that the instruction execution efficiency becomes low because the data transfer operation between the processors 10 is performed through the main memory whose operation speed is low and a large amount of data transfer time between the processors 10 is required.

Moreover, because each processor has the cache memory and it must be required to store the same data into the main memory and the cache memories in the conventional information processing device as shown in FIG. 1, designers must design complicated hardware configurations.

SUMMARY OF THE INVENTION

Accordingly, an object of the present invention is, with due consideration to the drawbacks of the conventional information processing device, to provide an information processing device having a plurality of processors formed on a single semiconductor chip that is capable of performing a high speed data transfer operation between the processors and of increasing an instruction execution efficiency, so that designers may easily design the information processing device.

In accordance with one aspect of the present invention, an information processing device has a plurality of processors each including a register file having a plurality of registers and exclusive data transfer buses through which specified registers in different processors in the plurality of processors are directly connected. Thus, in the information processing device of the present invention, a data read operation and a data write operation between the specified registers in the different processors are performed through the exclusive data transfer buses.

In accordance with a further aspect of the present invention, the specified registers have at least one general purpose register and at least one virtual register. The virtual register selectively receives data transferred through the exclusive buses from the other processor that is different from the processor having this virtual register, or the virtual register selectively transfers data through the exclusive data transfer buses to the processor that is different from the processor having this virtual register.

In accordance with another aspect of the present invention, the specified registers have at least one virtual register and at least one extension register that is incorporated for each virtual register. The virtual register selectively receives data transferred through the exclusive data transfer buses from the other processor that is different from the processor having this virtual register, or the virtual register selectively transfers data through the exclusive buses to the processor that is different from the processor having this virtual register. Data may be read from the extension register or written into the extension register in the processor having this extension register independently from the other processors.

In the information processing device of this embodiment, the virtual register is made up of a MOS FET whose source or drain terminal is connected to the exclusive bus and whose gate terminal is connected to a control bus (or a word line) for accessing the virtual register. The source or drain terminal is connected to a readout port through which data in the virtual register is read.

In the information processing device of this embodiment, each of the general purpose registers and the extension registers is made up of a memory circuit consisting of a flip-flop circuit to store data and a MOS FET. The MOS FET is placed between the memory circuit (namely, the flip-flop circuit) and a readout port or a write-in port. Data stored in the memory circuit is read to outside through the readout port or data from outside is written into the memory circuit through the write-in port. The source or drain terminal of the MOS FET is connected to the readout port or the write-in port and the gate terminal of the MOS FET is connected to a control line (or a word line) for accessing the general purpose register or the extension register.

In accordance with another aspect of the present invention, an information processing device comprises a plurality of processors each having a register file including at least a virtual register and an extension register. The plurality of processors are connected circularly through the exclusive data transfer buses and the virtual register in each processor is connected to the extension register in a previously stage through an exclusive data transfer bus.

The information processing device of this embodiment further comprises a main memory, and each of the plurality of processors accesses the main memory with a different fixed address.

BRIEF DESCRIPTION OF THE DRAWINGS

These and other objects, features, and advantages of the present invention will become more apparent from the following description of the preferred embodiments taken in conjunction with the accompanying drawings, in which:

FIGS. 6B$a$ and 6B$b$ are configuration diagrams of an information processing device as a second embodiment according to the present invention.

DESCRIPTION OF THE PREFERRED EMBODIMENTS

Other features of this invention will become apparent through the following description of preferred embodiments which are given for illustration of the invention and are not intended to be limiting thereof.

Preferred embodiments of an information processing device according to the present invention will now be described with reference to the drawings.

Embodiment 1

Figure 2:
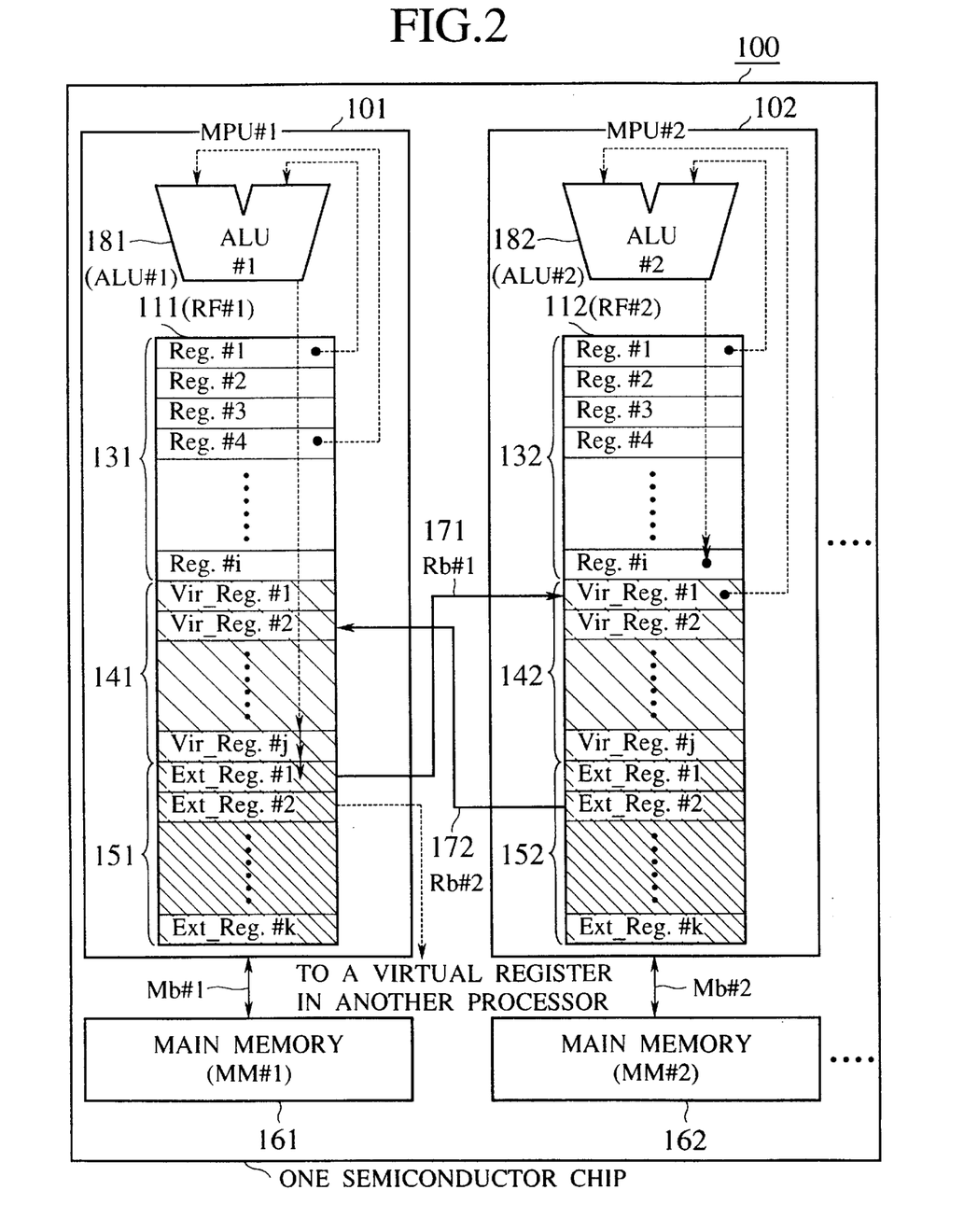
FIG. 2 is a configuration diagram of an information processing device having a plurality of processors (a multiprocessor) formed on a single semiconductor chip as a first embodiment according to the present invention.

FIG. 2 is a configuration diagram of an information processing device 100 having a plurality of processors formed on a single semiconductor chip as a first embodiment according to the present invention.

In the information processing device 100 shown in FIG. 2, reference numbers 101, 102, . . . designate a plurality of microprocessor units (MPUs, hereinafter referred to as "processors") formed on a single semiconductor chip. Each of the processors 101, 102, . . . has a main memory 161, 162, . . .

The information processing device 100 of FIG.2 shows only the connection relationship between the processors 101 and 102 in the plurality of processors for brevity.

The processors are connected with exclusive data transfer bus lines (hereinafter also referred to as exclusive data transfer buses). For example, specified registers in the register files 111 and 112 in the processor 101 and the processor 102 are connected with exclusive data transfer buses 171 and 172 for data read operation and data write operation.

The specified registers in each processor comprise registers that are the combination of general purpose registers (Reg.#1, Reg.#2, . . . ) 131, 132, . . . and virtual registers (Vir_Reg.#l, Vir_Reg.#2, . . . ) 141, 142, . . . and extension registers (Ext_Reg.#1, Ext_Reg.#2, . . . ) 151, 152, . . . For example, the specified registers in the processor 101 consists of general purpose registers 131 and the virtual registers 141. In this case, the virtual register 141 receives selectively data transferred from an external processor, for example, from the processor 102, other than the processor 101, through the exclusive data transfer bus (Rb#2) 172 or it transfers selectively data in the processor 101 to the other outside processor 102 through the exclusive data transfer bus (Rb#1) 171.

In another case, the specified registers in the processor 101 comprise the combination register of the virtual register 141 and the extension register 151. In this case, the virtual register 141 receives selectively data transferred from an external processor, for example, from the processor 102, other than the processor 101 through the exclusive data transfer bus (Rb#2) 172 or it transfers selectively data in the processor 101 to the other outside processor 102 through the exclusive data transfer bus (Rb#1) 171. Data may be read from or write into the extension register 151 independently from the operation of the other processor 102.

The feature of the information processing device 100 as the first embodiment 1 shown in FIG. 2 is that virtual registers are incorporated in each of the register files 111, 112, . . . in the processors (MPU#1, MPU#2, . . . ) 101, 102, . . . formed on a single semiconductor chip to read data from/write data into physical or concrete registers in another processors through the exclusive data transfer buses which are connected between the specified registers in different processors. In addition, when a processor writes data into its own virtual register, the data is transferred directly into registers in another processor connected to the processor with the exclusive data transfer buses, not through a main memory, so that high speed data transfer can be achieved between these processors.

FIG. 2 shows only the processors 101, 102, . . . each having the register file 111, 112, . . . and arithmetic logic unit (ALU#1, ALU#2, . . . ) 181, 182, . . . , and does not show other elements such as a control circuit, an instruction fetch unit, a memory access unit, and the like, for brevity.

In the information processing device 100 shown in FIG. 2, the registers 131, 132 are the general purpose registers which may be used for reading/writing of data.

The virtual register 141 has the registers Vir_Reg.#1, Vir_Reg.#2, . . . ,Vir_Reg.#i. The virtual register 141 is not a physical register in the register files 111 and 112. The configuration of each virtual register will be explained later in detail with reference to FIGS. 7A and 7B. Each virtual register comprises a transfer gate G1 or G2 and is connected to the general purpose register or the extension register in another processor through the exclusive data transfer bus. In other words, the virtual register is directly connected to the register in another processor through the exclusive data transfer bus (Rb#1 or Rb#2) 171, 172, and the processor can read data stored in the register into another processor through its own virtual register.

The read/write operations to/from the virtual register are the same as that to the general purpose register and the extension register which are connected to the virtual register.

Each extension register 151, 152 comprises the registers (Ext_Reg.#1, Ext_Reg.#2, . . . , Ext_Reg.#k) which are physical registers incorporated in each register file (RF#1, RF#2, . . . ) 111, 112, and each extension register is directly connected to the virtual register in another processor through the exclusive data transfer bus. Each extension register permits both the read/write data operations or only one of the read/write data operations.

Hereinafter, the connection relationships between the register files 111 and 112 through the exclusive data transfer buses in the processors 101 and 102 will be explained. In these cases, each extension register (Ext_Reg.#1, Ext_Reg.#2) 151, 152 in each processor permits both the read/write data transfer operations.

As indicated by the arrows of FIG. 2, the extension register (Ext_Reg.#1) in the processor (MPU#1) 101 is directly connected to the virtual register (Vir_Reg.#1) in the processor (MPU#2) 102 through the exclusive data transfer bus (Rb#1) 171. When the processor (MPU#2) 102 reads data stored in the virtual register (Vir_Reg.#1) in the register file 112, the exclusive data transfer bus (Rb#1) 171 becomes the exclusive data transfer bus for the readout data operation through which the data in the extension register (Ext_Reg.#1) in the processor (MPU#1) 101 is transferred to the processor (MPU#2) 102 side.

As also indicated by the arrows of FIG. 2, the extension register (Ext_Reg.#2) in the processor (MPU#2) 102 is directly connected to the virtual register (Vir_Reg.#2) in the processor (MPU#1) 101 through the exclusive data transfer bus (Rb#2) 172. When the processor (MPU#1) 101 reads data stored in the virtual register (Vir_Reg.#2) in the register file 111, the exclusive data transfer bus 172 becomes the exclusive data transfer bus for the readout data operation through which the data in the extension register (Ext_Reg.#2) in the processor (MPU#2) 102 is transferred to the processor (MPU#1) 101 side.

In the information processing device 100 shown in FIG. 2, the virtual registers (Vir_Reg.#2 to Vir_Reg.#j) in the processor (MPU#2) 102 and the virtual registers (Vir_Reg.#1, Vir_Reg.#3, ..., Vir_Reg.#j) are connected to the corresponding extension registers in another processor in one to one connection (These connections are omitted from FIG. 2 for brevity.).

Each processor (MPU#1, MPU#2, ...) 101, 102, ... is connected to each corresponding main memory (MM#1, MM#2, ...) 161, 162, ... through each memory bus Mb#1, Mb#2, ...

When arithmetic operations are executed by both the processors 101 and 102 in the information processing device having the above configuration, for example, when an addition operation between the general purpose registers Reg.#1 and Reg.#4 in the processor (MPU#1) 101 is executed and the addition result is then added to the data stored in the general purpose register Reg.#1 in the processor (MPU#2) 102, and when the result is further stored into the general purpose register (Reg.#i) in the processor (MPU#1) 101, the processor (MPU#1) 101 writes the addition result between the general purpose registers Reg.#1 and Reg.#4 into the extension register Ext_Reg.#1 in the processor 101. The addition result is transferred from the Ext_Reg.#1 of MPU 101 to Vir_Reg.#1 of MPU 2. The processor (MPU#2) 102 performs the addition operation between the virtual register Vir_Reg.#1 and the general purpose register Reg.#1 in the processor 101 and writes this addition result into the general purpose register Reg.#i. The transfer of the addition result to register Vir_Reg.#1 of MPU 102 and the addition by ALU#2 is simultaneous.

The following describes how the addition result of the processor (MPU#1) 101 is known by the processor (MPU#2) 102 side.

All of the processors 101, 102, ... in the information processing device 100 shown in FIG. 2 operate synchronously with each other and each addition operation is performed at a timing by which the addition result may be transferred correctly between the processors. The addition result may be stored within this timing into the main memory (MM#1, MM#2) 161, 162 connected to the processors 101, 102.

There are other connection relationships between the general purpose registers Reg.#1, ..., the virtual registers Vir_Reg.#1, ..., and the extension registers Ext_Reg.#1, ... in the processors 101 and 102 other than the connection relationship in the information processing device 100 as the first embodiment shown in FIG. 2.

Figure 3A:
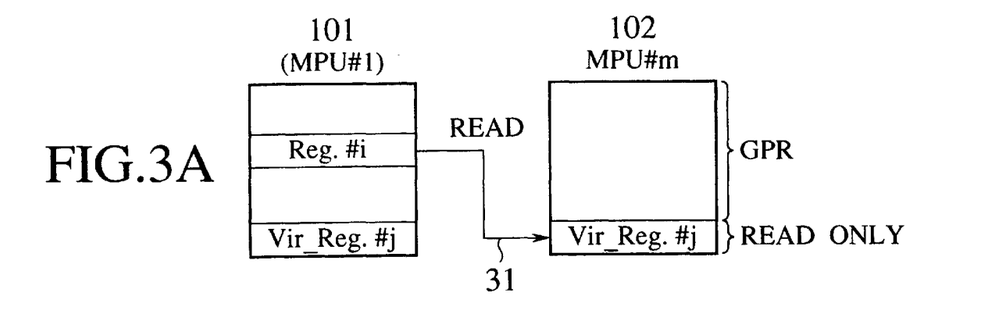
FIGS. 3A to 3C are diagrams showing connection relationships between the registers in the information processing device of the first embodiment shown in FIG. 2.
Figure 3B:
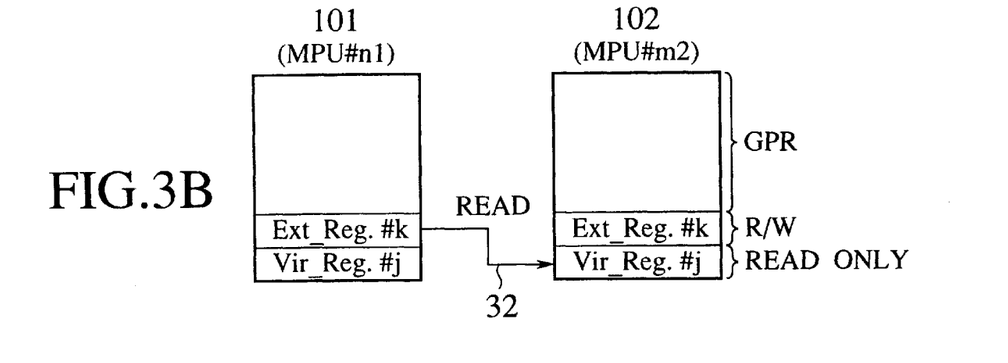
Figure 3C:
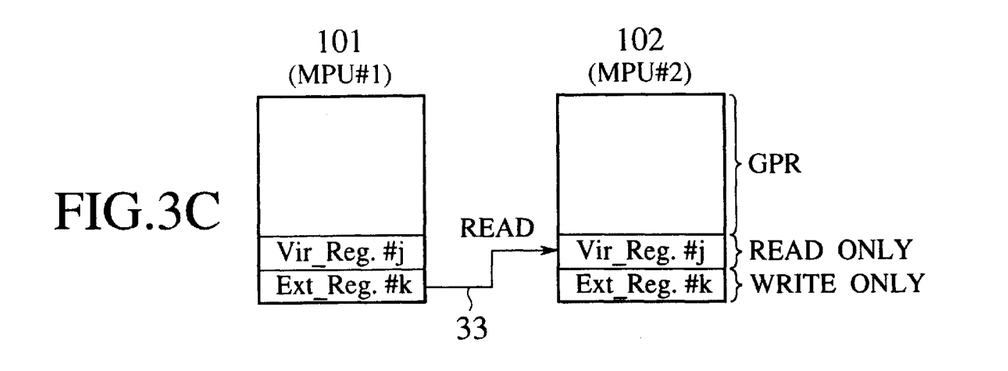
Figure 4A:
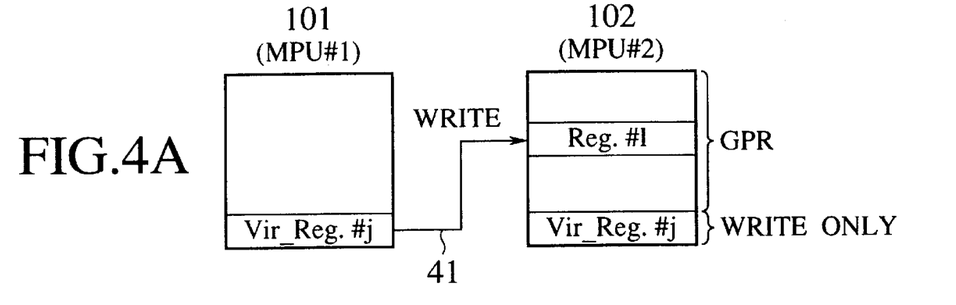
FIGS. 4A to 4C are diagrams showing other connection relationships between the registers in the information processing device of the first embodiment shown in FIG. 2.
Figure 4B:
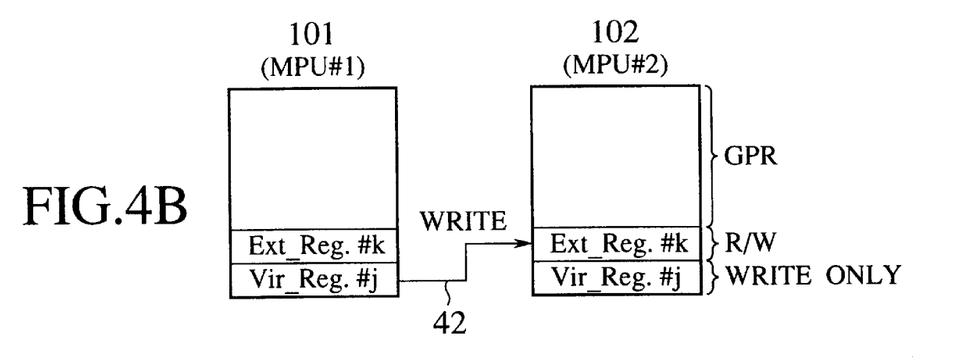
Figure 4C:
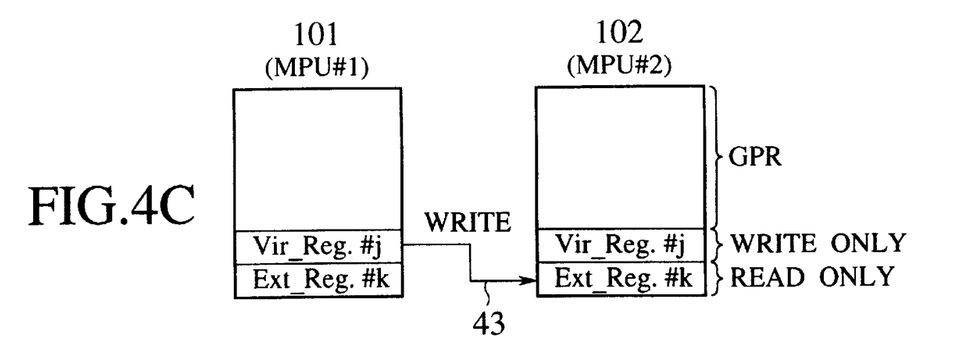

FIGS. 3A to 3C are diagrams showing connection relationships between the registers in the information processing device 100 of the first embodiment shown in FIG. 2. FIGS. 4A to 4C are diagrams showing other connection relationships between the registers in the information processing device 100 of the first embodiment shown in FIG. 2. FIGS. 5A to 5D are diagrams showing other connection relationships between the registers in the information processing device 100 of the first embodiment shown in FIG. 2. These connection relationships shown in FIGS. 3A to 3C, 4A to 4C, and 5A to 5D are only examples. It can also be acceptable to form the connection relationships between the registers other than the connection relationships described above.

In the connection relationship shown in FIG. 3A, the processor 102 performs only the data read operation from an optional general purpose register Reg.#i in the processor 101 to the virtual register Vir_Reg.#j through the exclusive data transfer bus 31.

In the connection relationship shown in FIG. 3B, the processor 102 performs only the data read operation from the extension register Ext_Reg.#k specified by an instruction in the processor 101 to the virtual register Vir_Reg.#j through the exclusive data transfer bus 32. In this case, the processor (MPU#1) 101 reads data from/writes data into the extension register Ext_Reg.#k independently from other processors.

In the connection relationship shown in FIG. 3C, the processor 102 performs only the data read operation from the extension register Ext_Reg.#k specified by an instruction in the processor 101 to the virtual register Vir_Reg.#j through the exclusive data transfer bus 33. In this case, the processor (MPU#1) 101 only reads data stored in the extension register Ext_Reg.#k independently from other processors.

In the connection relationship shown in FIG. 4A, the processor 101 performs only the data write operation from the virtual register Vir_Reg.#j in the processor 101 to an optional general purpose register Reg.#1 in the processor (MPU#2) 102 through the exclusive data transfer bus 41.

In the connection relationship shown in FIG. 4B, the processor 101 performs only the data write operation from the virtual register Vir_Reg.#j in the processor 101 to the extension register Ext_Reg.#k specified by an instruction in the processor (MPU#2) 102 through the exclusive data transfer bus 42. In this case, the processor (MPU#2) 102 reads data from/writes data into the extension register Ext_Reg.#k independently from other processors.

In the connection relationship shown in FIG. 4C, the processor 101 performs only the data write operation from the virtual register Vir_Reg.#j in the processor 101 to the extension register Ext_Reg.#k by an instruction in the processor (MPU#2) 102 through the exclusive data transfer bus 43. In this case, the processor (MPU#2) 102 only reads data stored in the extension register Ext_Reg.#k independently from other processors.

Figure 5A:
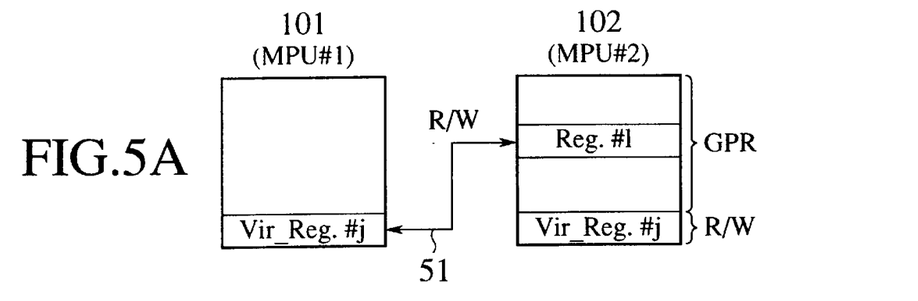
FIGS. 5A to 5D are diagrams showing other connection relationships between the registers in the information processing device of the first embodiment shown in FIG. 2.

In the connection relationship shown in FIG. 5A, the processor 101 performs the data read/write operations from the virtual register Vir_Reg.#j in the processor 101 to an optional general purpose register Reg.#1 in the processor (MPU#2) 102 through the exclusive data transfer bus 51.

Figure 5B:
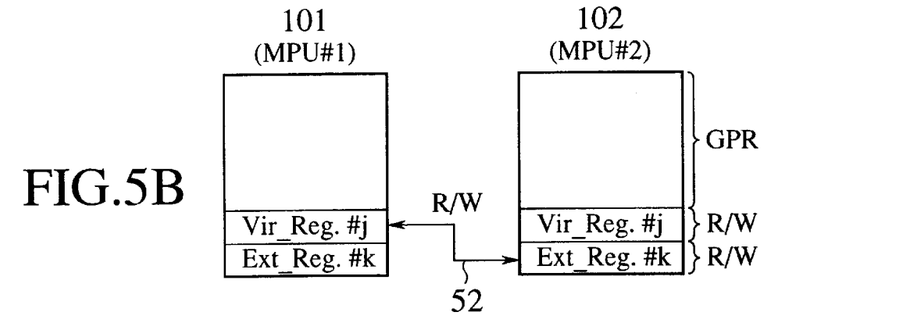

In the connection relationship shown in FIG. 5B, the processor 101 performs the data read/write operations from the virtual register Vir_Reg.#j in the processor 101 to the specified extension register Ext_Reg.#k specified by an instruction in the processor (MPU#2) 102 through the exclusive data transfer bus 52. In this case, the processor (MPU#2) 102 reads and writes data into and from the extension register Ext_Reg.#k independently from other processor.

Figure 5C:
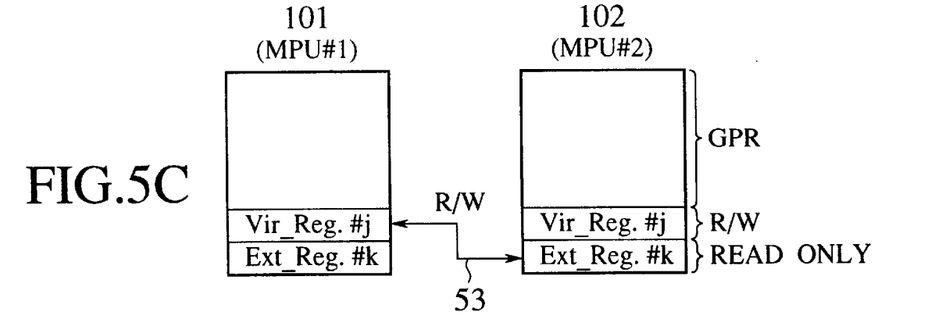

In the connection relationship shown in FIG. 5C, the processor 101 performs the data read/write operations from the virtual register Vir_Reg.#j in the processor 101 to the extension register Ext_Reg.#k specified by an instruction in the processor (MPU#2) 102 through the exclusive data transfer bus 53. In this case, the processor (MPU#2) 102 only reads data stored in the extension register Ext_Reg.#k in the processor 102 independently from other processors.

Figure 5D:
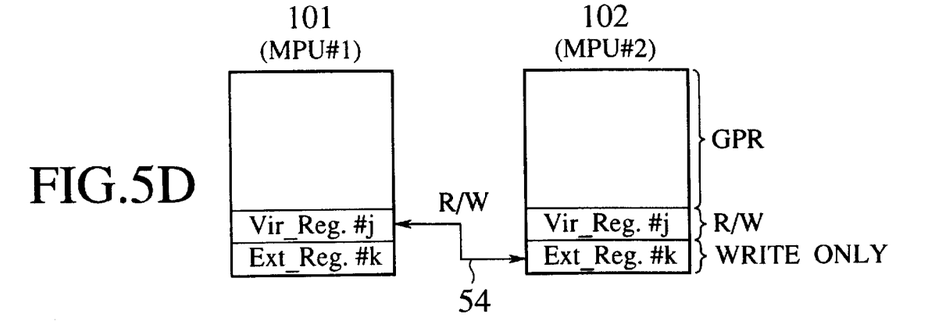

In the connection relationship shown in FIG. 5D, the processor 101 performs the data read/write operations from the virtual register Vir_Reg.#j in the processor 101 to the specified extension register Ext_Reg.#k specified by an instruction in the processor (MPU#2) 102 through the exclusive data transfer bus 54. In this case, the processor (MPU#2) 102 only writes data into the extension register Ext_Reg.#k in the processor 102 independently from other processors.

As described above, in the information processing device 100 as the first embodiment according to the present invention shown in FIG. 2, it can also be acceptable to form other connection relationships between the general purpose registers Reg.#1, ..., the virtual registers Vir_Reg.#1, ..., and the extension registers Ext_Reg.#1, ... other than the connection relationships shown in FIG. 2, FIGS. 3A to 3C, FIGS. 4A to 4C, and FIGS. 5A to 5C.

FIGS. 3A-3C, 4A-4C and 5A-5D show that the exclusive data transfer buses can be connected between any type of registers and perform any function, i.e., READ, WRITE, or R/W irrespective of the function of the register in a particular MPU. In other words, the exclusive data transfer bus can read from or write to a READ only, a WRITE only, or R/W register.

Embodiment 2

Figure 6:
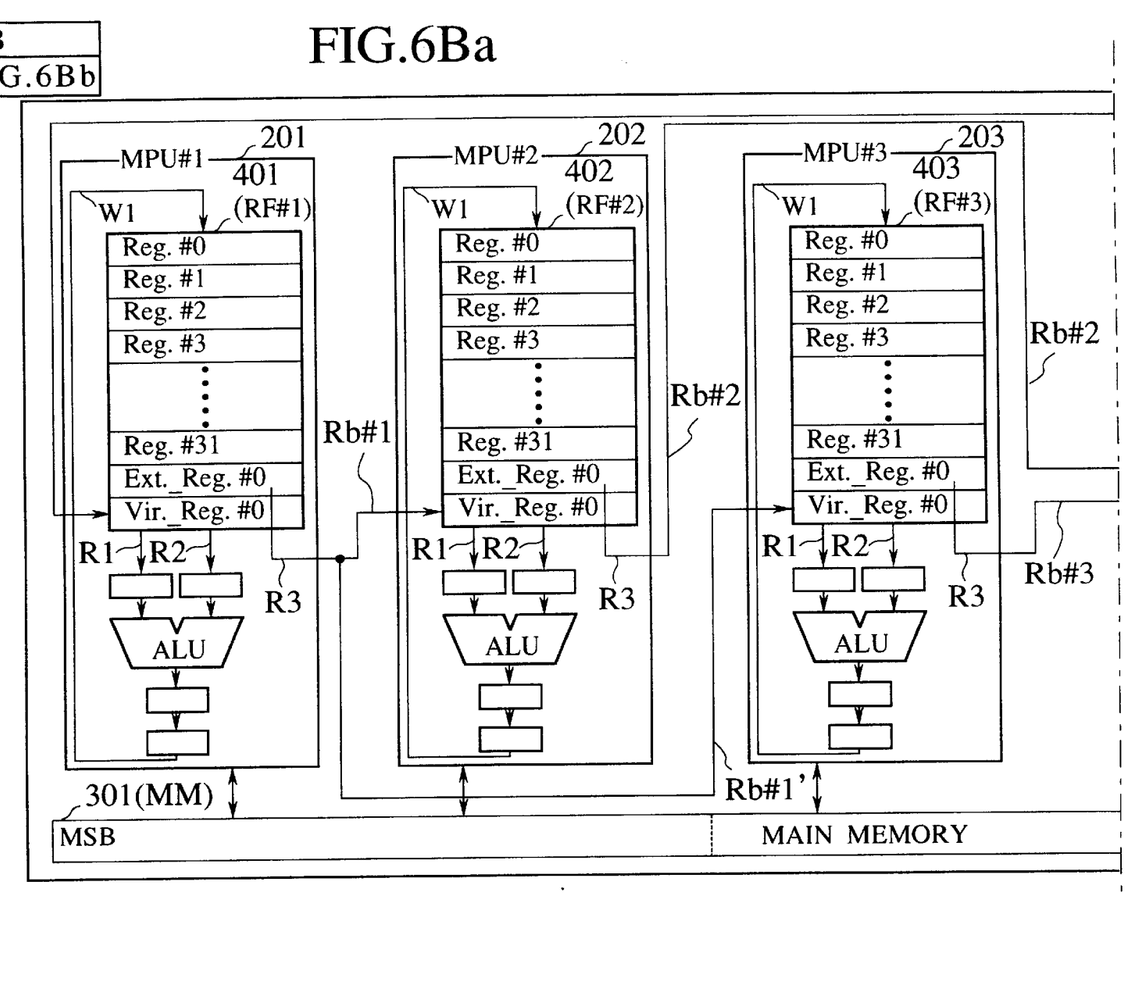
Figure 6A:
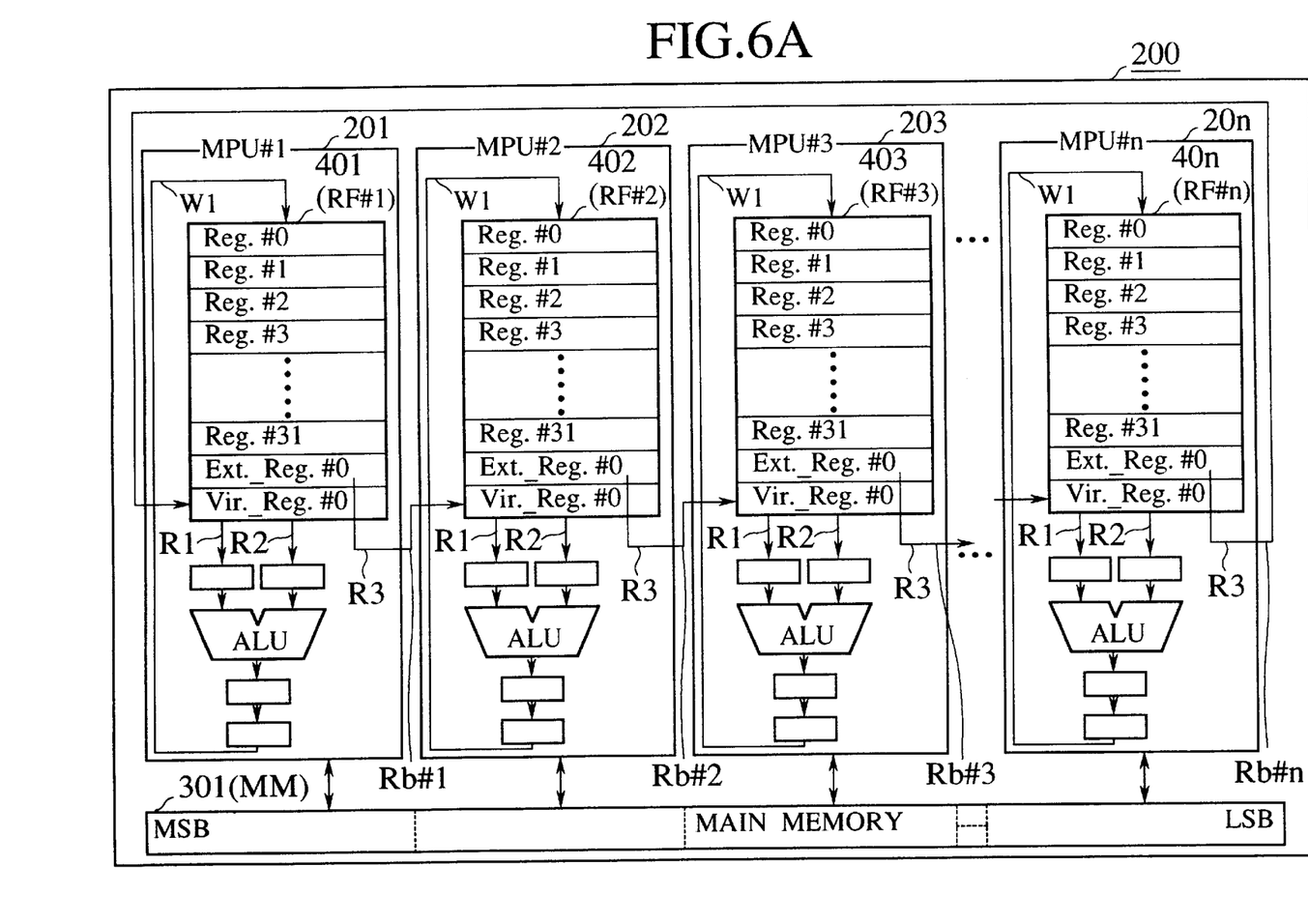
FIG. 6A is a configuration diagram of an information processing device as a second embodiment according to the present invention.

FIG. 6A is a configuration diagram of an information processing device 200 as a second embodiment according to the present invention.

The information processing device 200 of the second embodiment shown in FIG. 6A comprises a plurality of microprocessor units (MPU#1, MPU#2, ... MPU#n, hereinafter referred to as processors MPU#l, MPU#2, ... ,MPU#n) and a main memory (MM) 301. Each of the processors (MPU#l,..,MPU#n) has a respective register file 401, 402, ..., 40n. Each register file 401, 402, ..., 40n comprises a virtual register Vir_Reg.#0 and an extension register Ext_Reg.#0. The virtual register Vir_Reg.#0 is connected to the extension register Ext_Reg.#0 in a previous processor through an exclusive data transfer bus Rb#l, Rb#2, ... ,Rb#n and the processors (MPU#1, MPU#2, ... ,MPU#n) 201, 202, ..., 20n are connected circularly through the exclusive data transfer buses Rb#1, Rb#2, ..., Rb#n. This configuration shown in FIG. 6A forms a parallel information processing device.

Each processor (MPU#1, MPU#2, ... ,MPU#n) 201, 202, ..., 20n comprises the virtual register Vir_Reg.#0 and the extension register Ext_Reg.#0. Each processor 201, 202, ... ,20n may read data from and write data into the general purpose registers Reg.#0 to Reg.#31 and the extension register Ext_Reg.#0. But each processor 201, 202, ..., 20n only reads data in the virtual register Vir_$_{Reg.\#0}$.

Each of the exclusive data transfer buses Rb#0 to Rb#n is a one way bus through which data is only transferred from the extension register Ext_Reg.#0 to the virtual register Vir_Reg.#0.

The buses R1, R2, and R3 designate readout ports through which data is read out. A bus W1 denotes a write-in port through which data is written.

The data stored in the extension register Ext_Reg.#0 is transferred through the bus R3 which is connected to the exclusive data transfer bus Rb#1, Rb#2, ..., Rb#n. Data stored in other registers is not transferred through this bus R3. In this configuration shown in FIG. 6A, for example, the processor (MPU#2) 202 can always read data stored in the extension register Ext_Reg.#0 in the processor (MPU#1) 201 through the virtual register Vir_Reg.#0 in the processor (MPU#2) 202.

Each processor (MPU#1, MPU#2, ... ) 201, 202, ... uses an address that is different from an address used in other processors in order to access a specified memory address field in the main memory (MM) 301 for each processor. In other words, the address to be transferred to the main memory (MM) 301 from each processor is a fixed address value because a data bus connected between each processor and the main memory (MM) 301 is connected to a fixed bit position in the main memory (MM) 301 per processor. By this configuration, the information processing device 200 of the second embodiment can fetch and execute instructions which are stored in series in the main memory (MM) 301 for a parallel operation at the same time.

Because the virtual register Vir_Reg.#0 in any processor can receive data from the extension register Ext_Reg.#0 in the adjacent processor through the exclusive data transfer buses Rb#1, Rb#2, ... when data is written into the extension register Ext_Reg.#0 in this adjacent processor in the information processing device 200 shown in FIG. 6A (for example, under the connection relationship as shown FIG. 3B), a high speed data transfer operation can be executed when compared with the conventional information processing device shown in FIG. 1. In the conventional information processing device shown in FIG. 1, data is transferred between processors through the main memory. Furthermore, complicated arithmetic operations between the processors can also be performed in the information processing device 200.

FIG. 6B shows another configuration diagram of an information processing device 200' as the second embodiment according to the present invention.

The information processing device 200' of the second embodiment shown in FIG. 6B comprises a plurality of microprocessor units (MPU#1, MPU#2, MPU#3, MPU#4, ..., MP#n, hereinafter referred to as processors MPU#1, MPU#2, ... ,MPUπn) 201, 202, 203, 204, ..., 20n and a main memory (MM) 301. Just like the example as shown in FIG. 6A, each of the processors (MPU#l, MPU#2, ..., MPU#n) has a respective register file 401, 402, 403, 404, ..., 40n. Each register file 401, 402, 403, 404, ..., 40n comprises at least one virtual register Vir_Reg.#0 and at least one extension register Ext_Reg.#0. The virtual registers Vir_Reg.#0 in the processors MPU#2 and MPU#3 are connected to the extension register Ext_Reg.#0 in the processor MPU#1 through exclusive data transfer buses Rb#1 and Rb#1'. In addition, the virtual register Vir_Reg.#0 in the processor MPU#4 is directly connected to the extension register Ext_Reg.#0 in the processor (MPU#2) 202 and the virtual register Vir_Reg.#1 in the processor MPU#4 is directly connected to the extension register Ext_Reg.#0 in the processor (MPU#3) 103. Thus, the present invention permits multiple connections between the processors MPU#0, MPU#1, . . . ,MPU#n.

This configuration shown in FIG. 6B forms a parallel information processing device. Each processor (MPU#1 MPU#2, . . . ,MPU#n) 201, 202, . . . , 20n comprises the virtual register Vir_Reg.#0 and the extension register Ext_Reg.#0. Each processor 201, 202, . . . ,20n may read data from and write data into the general purpose registers Reg.#0 to Reg.#31 and the extension register Ext_Reg.#0. But each processor 201, 202, . . . , 20n only reads data in the virtual register Vir_Reg.#0.

In both the configurations of the information processing devices 200 and 200' shown in FIGS. 6A and 6B, each processor (MPU#1, MPU#2, . . . ) can execute a simple arithmetic operation. For example, when the entire processors (MPU#1, MPU#2, . . . , MPU#n) 201, 202, . . . , 20n form an adder and one processor operates an integer addition/subtraction operation and an arithmetic operation, and another processor performs a floating point subtraction arithmetic operation, a floating point multiplication operation, and a floating point square root operation. These small sized processors (MPU#1, . . . ) have few execution units and few ports for the register file 401, 402, . . . In other words, each of these processors has a small sized execution unit and a small number of ports. In addition, the direction of the data transfer operation between the processors is fixed. Therefore when each processor (MPU) is formed by using a scalar processor, it is unnecessary to perform an out-of-order issue operation and an out-of-order completion operation. This results in a simple configuration of the information processing device of the present invention without complicated operation control. The information processing device comprising small sized processors of the present invention can operate at a high order operational frequency.

The configuration of each virtual register comprises a gate circuit through which data is selectively transferred to a readout port in a processor through the exclusive data transfer bus based on a control signal indicating the virtual register. The configuration of each virtual register comprises a gate circuit through which data sent to the write-in port in a processor is selectively transferred to the exclusive data transfer bus based on a control signal indicating the virtual register.

Figure 7A:
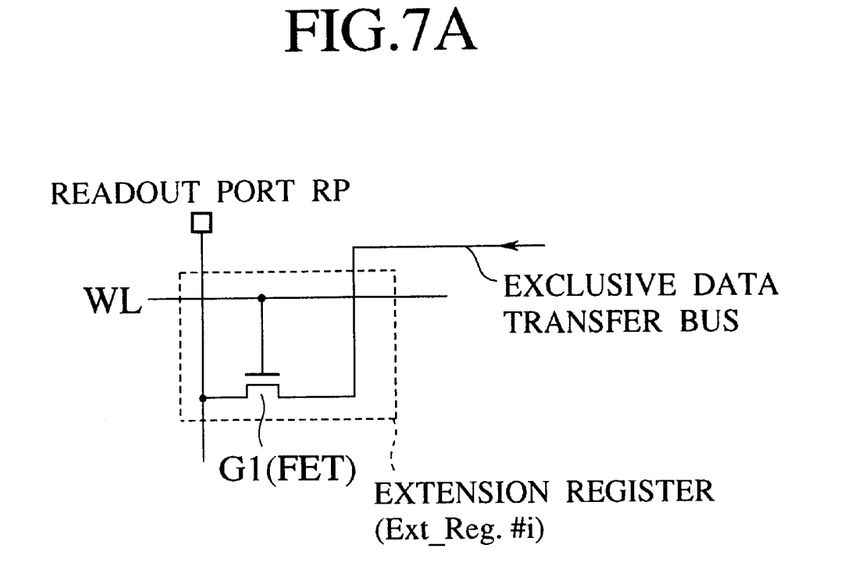
FIGS. 7A and 7B are diagrams showing concrete configurations of the virtual register incorporated in the information processing devices as the first and second embodiments shown in FIGS. 2 to 6.
Figure 7B:
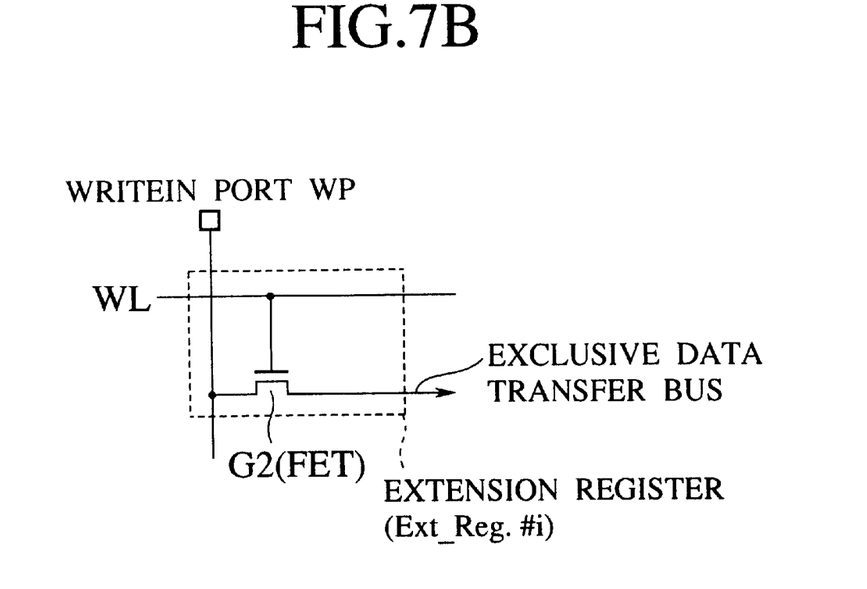

FIGS. 7A and 7B are diagrams showing concrete configurations of a virtual register incorporated in the information processing devices 100 and 200 as the first and second embodiments shown in FIGS. 2 to 6.

As shown in FIG. 7A, the virtual register comprises a MOS FET G1 (a metal oxide semiconductor field effect transistor) as a transfer gate. A terminal of the gate of the MOS FET G1 is connected to a word line WL through which a control signal addressing the virtual register is transferred. The source terminal and the drain terminal are connected to an exclusive data transfer bus and to the readout port RP. Thus, the MOS FET G1 forming the virtual register is placed between the exclusive data transfer bus and the readout port RP. In addition, as shown in FIG. 7B, the virtual register comprises a MOS FET G2 as a transfer gate. A terminal of the gate of the MOS FET G2 is connected to a word line WL through which a control signal to address the virtual register is transferred. The source terminal and the drain terminal are connected to an exclusive data transfer bus and to the write-in port WP through which data is transferred. Thus, the MOS FET G2 forming the virtual register is placed between the exclusive data transfer bus and the write-in port WP.

Figure 8A:
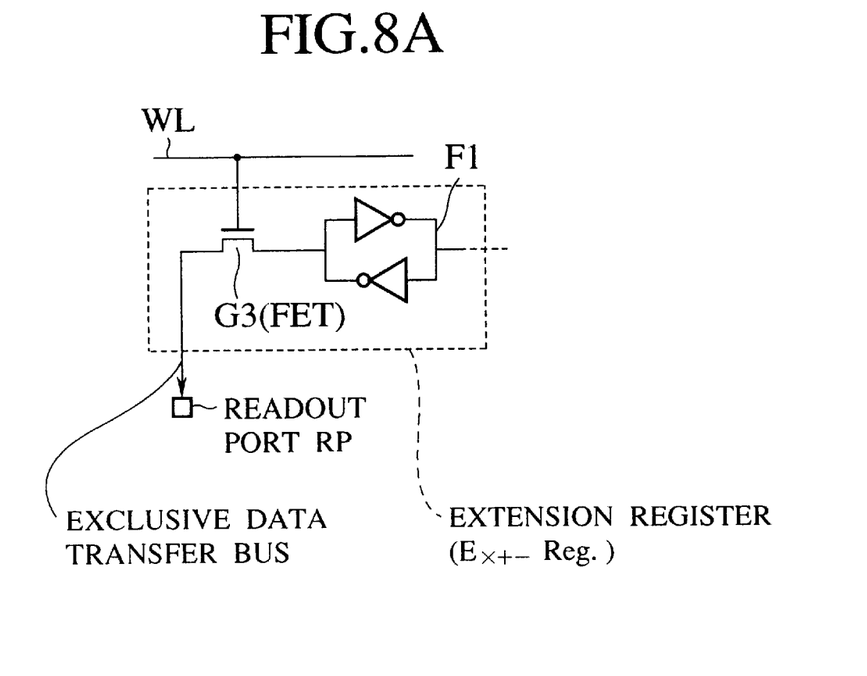
FIGS. 8A and 8B are diagrams showing concrete configurations of the extension register incorporated in the information processing devices as the first and second embodiments shown in FIGS. 2 to 6.
Figure 8B:
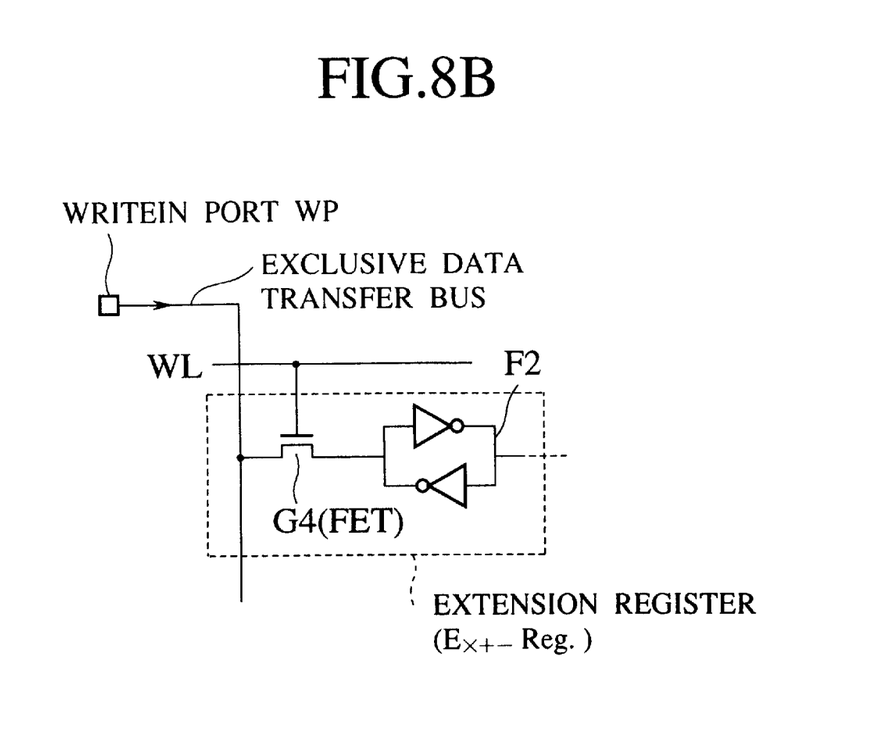

FIGS. 8A and 8B are diagrams showing concrete configurations of an extension register incorporated in the information processing devices 100 and 200 as the first and second embodiments shown in FIGS. 2 to 6.

The extension register shown in FIG. 8A comprises a memory circuit F1, a MOS FET G3 as a transfer gate and a readout port RP through which data stored in the memory circuit F1 is transferred. The extension register shown in FIG. 8B comprises a memory circuit F2, a MOS FET G4 as a transfer gate and a write-in port WP through which data is transferred into the memory circuit F2.

In both configurations of the virtual registers shown in FIGS. 8A and BB, the memory circuit F1 is made up of a flip flop circuit in which input/output terminals of inverters are connected to each other. One output terminal of the flip flop circuit F1 is the readout port RP through the MOS FET G3 that receives the control signal through the word line WL. The memory circuit F2 is also made up of a flip flop circuit in which input/output terminals of inverters are connected to each other. One output terminal of the flip flop circuit F2 is the writein port WP through the MOS FET G4 that receives the control signal through the word line WL.

The main characteristic features of the information processing device in accordance with the present invention are, in summary, as follows.

Since the information processing device of a large sized configuration of each embodiment of the present invention comprises a plurality of small sized processors (MPUs) and because each processor executes few instructions simultaneously, each processor (MPU) has a simple configuration in which the number of execution units becomes few, each processor can perform under simple control and a design cost of the information processing device becomes low.

By the present invention, an information processing device of a large sized configuration having a high performance can be provided by combination of a plurality of processors each of which has a small sized configuration and a simple function.

By the present invention, information processing devices of various sized configuration can be provided by changing the number of processors and designers can design freely the configuration of the information processing device.

The invention allows a designer to optimize the order of instructions that are executed by each processor by a compiler in order to increase the through-put of the information processing device of the present invention, By the present invention, it is possible to optimize the hardware configuration of an information processing device having the maximum through-put rate in a specified arithmetic field by changing the number of MPUs and the number of data transfer buses, and the connection configurations of the data transfer buses.

By means of the present invention which has been explained in detail described above, since specified registers in different processors in the information processing device are directly connected with exclusive data transfer buses in order to transfer data, a high speed data transfer operation can be achieved and the processing efficiency of an information processing device can also be increased. An information processing device having a simple design configuration can also be provided when the data transfer direction is fixed between registers in an information processing device.

Furthermore, the present invention does not require the ALU, but only the register file plus some other circuitry (calculator or processor).

Moreover, the present invention provides the information processing device having a plurality of MPUs in which multiple connections between MPU registers (one external register to plural virtual registers, for example) are formed.

While the above provides a full and complete disclosure of the preferred embodiment of the present invention, various modifications, alternate constructions and equivalents any be employed without departing from the true spirit and scope of the invention. Therefore the above description and illustration should not be construed as limiting the scope of the present invention, which is defined by the appended claims.

What is claimed is:

1. An information processing device comprising:
   a plurality of processors each including a register file having a plurality of real and virtual registers; and
   exclusive data transfer buses through which said real and virtual registers of different processors in the plurality of processors are directly connected,
   wherein at least one of a data read operation and a data write operation executed between a real register and a virtual register in the different processors is performed through the exclusive data transfer buses, and
   wherein each virtual register has no actual storage means but is responsive to said at least one of a data read operation and a data write operation by accessing to a real register connected to said each virtual register.

2. An information processing device as claimed in claim 1, where the real registers comprise at least one general purpose register and the virtual register at least one of selectively receives data transferred through the exclusive data transfer buses from another processor different from a processor having this virtual register, and selectively transfers data through the exclusive data transfer buses to the another processor.

3. An information processing device as claimed in claim 1, wherein the real registers comprise at least one extension register that is corresponding to each virtual register; the virtual register at least one of selectively receives data transferred through the exclusive data transfer buses from another processor different from a processor having this virtual register, and selectively transfers data through the exclusive buses to the another processor, and data may be one of read from the extension register and written into the extension register in the processor having the extension register independently from the other processors.

4. An information processing device as claimed in claim 1, wherein the virtual register comprises a MOS FET having a source and a drain terminal, one of which is connected to the exclusive data transfer bus, and a gate terminal connected to a control line for accessing the virtual register, and the other of the source and drain terminal is connected to a readout port through which data in the virtual register is read.

5. An information processing device as claimed in claim 1, wherein the virtual register comprises a MOS FET having a source and a drain terminal, one of which is connected to the exclusive data transfer bus, and a gate terminal connected to a control line for accessing the virtual register, and the other of the source and drain terminals is connected to a write-in port through which data in the virtual register is written.

6. An information processing device as claimed in claim 1, wherein the virtual register comprises a gate circuit whose source or drain terminal is connected to the exclusive data transfer bus and whose gate terminal is connected to a control line for accessing the virtual register, and the other of said source or drain terminal is connected to a readout port through which data in the virtual register is read.

7. An information processing device as claimed in claim 1, wherein the virtual register comprises a MOS FET having a source and a drain terminal, one of which is connected to the exclusive data transfer bus, and a gate terminal connected to a control line for accessing the virtual register, and the other of the source and drain terminal is connected to a write-in port through which data in the virtual register is read.

8. An information processing device as claimed in claim 1, wherein said information processing device is formed on a single semiconductor chip.

9. An information processing device as claimed in claim 2, wherein the general purpose registers comprise a memory circuit consisting of a flip-flop circuit to store data and a MOS FET that is placed between the memory circuit and a readout port or a write-in port, data stored in the memory circuit is read to outside through the readout port or data from outside is written into the memory circuit through the write-in port, one of the source and drain terminals of the MOS FET is connected to the readout port of the write-in port while the other of the source and drain terminals of the MOS FET is connected to the memory circuit, and the gate terminal of the MOS FET is connected to a control line (or a word line) for accessing the general purpose register.

10. An information processing device as claimed in claim 3, wherein the extension registers comprise a memory circuit consisting of a flip-flop circuit to store data and a MOS FET that is placed between the memory circuit and a readout port or a write-in port, data stored in the memory circuit is read to outside through the readout port or data from outside is written into the memory circuit through the write-in port, one of the source and drain terminals of the MOS FET is connected to the readout port or the write-in port while the other of the source and drain terminals of the MOS FET is connected to the memory circuit, and the gate terminal of the MOS FET is connected to a control line (or a word line) for accessing the extension register.

11. An information processing device as claimed in claim 9, wherein the virtual register comprises a gate circuit whose source or drain terminal is connected to the exclusive data transfer bus and whose gate terminal is connected to a control line for accessing the virtual register, and the other of said source or drain terminal is connected to a readout port or write-in port through which data in the virtual register is read.

12. An information processing device as claimed in claim 10, wherein the virtual register comprises a gate circuit whose source or drain terminal is connected to the exclusive data transfer bus and whose gate terminal is connected to a control line for accessing the virtual register, and the other of said source or drain terminal is connected to a readout port or write-in port through which data in the virtual register is read or written.

13. An information processing device comprising:
   a plurality of processors each having a register file including at least a virtual register and an extension register, and exclusive data transfer buses through which the plurality of processors are connected circularly, wherein the virtual register in each processor is connected to the extension register in a different processor in arrangement through one of the exclusive data transfer bus.

14. An information processing device as claimed in claim 13, further comprising a main memory, and each of the plurality of processors accesses the main memory with a different fixed address.

15. An information processing device as claimed in claim 13, wherein said information processing device is formed on a single semiconductor chip.

16. An information processing device comprising:

a plurality of processors, each said processor having a plurality of real registers and at least one of said processors having at least one virtual register; and a data transfer bus connected between a selected virtual register in a first one of said processors and a selected one of said real registers in a second one of said processors.

17. An information processing device as claimed in claim 16, wherein:

said selected register in said second processor is an extension register.

18. An information processing device as claimed in claim 16, comprising:

a second data transfer bus connected between a real register in the first one of said processors and a virtual register in the second one of said processors.

19. An information processing device as claimed in claim 16, wherein:

said data transfer bus comprises a plurality of data transfer buses;

each of said plurality of processors is connected to an adjacent one said processors using one of said data transfer buses; and a last one of said processors is connected to a first one of said processors using one of said data transfer buses.

20. An information processing device as claimed in claim 16, wherein said information processing device is formed on a single semiconductor chip.

21. An information processing device as claimed in claim 18, wherein:

said data transfer bus is connected to a virtual register in said first processor and an extension register in said second processor; and said second data transfer bus is connected to an extension register in said first processor and a virtual register in said second register.

* * * * *